(12) United States Patent
Sakai

(10) Patent No.: US 12,067,381 B2
(45) Date of Patent: Aug. 20, 2024

(54) CENTER, UPDATE MANAGEMENT METHOD, AND NON-TRANSITORY STORAGE MEDIUM

(71) Applicant: TOYOTA JIDOSHA KABUSHIKI KAISHA, Toyota (JP)

(72) Inventor: Yoshikazu Sakai, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 17/521,484

(22) Filed: Nov. 8, 2021

(65) Prior Publication Data
US 2022/0222054 A1    Jul. 14, 2022

(30) Foreign Application Priority Data

Jan. 14, 2021  (JP) ................................ 2021-004360

(51) Int. Cl.
G06F 8/65 (2018.01)
H04L 12/40 (2006.01)
H04W 4/48 (2018.01)

(52) U.S. Cl.
CPC .............. *G06F 8/65* (2013.01); *H04L 12/40* (2013.01); *H04W 4/48* (2018.02); *H04L 2012/40273* (2013.01)

(58) Field of Classification Search
None
See application file for complete search history.

(56) References Cited

U.S. PATENT DOCUMENTS

| | | | |
|---|---|---|---|
| 11,023,223 B2* | 6/2021 | Ishikawa | H04L 67/34 |
| 2006/0005046 A1* | 1/2006 | Hars | G06F 21/572 |
| | | | 714/E11.207 |
| 2015/0301822 A1 | 10/2015 | Takahashi et al. | |
| 2018/0048473 A1* | 2/2018 | Miller | H04L 9/30 |
| 2018/0232223 A1* | 8/2018 | Madrid | G06F 8/71 |
| 2019/0227782 A1* | 7/2019 | Chakkaravarthi | H04L 67/34 |
| 2019/0391800 A1* | 12/2019 | Lin | G06F 8/65 |

(Continued)

FOREIGN PATENT DOCUMENTS

| | | | | |
|---|---|---|---|---|
| CN | 1696900 A | * | 11/2005 | B60L 3/0023 |
| CN | 102064958 A | * | 5/2011 | H04L 41/12 |

(Continued)

*Primary Examiner* — Philip Wang
(74) *Attorney, Agent, or Firm* — Oliff PLC

(57) ABSTRACT

A center, configured to communicate with an OTA master that controls software updating of a plurality of electronic control units, includes a processor. The processor is configured to receive, from the OTA master, first identification information that identifies the electronic control units, and to store compatibility information that defines a version of software that is compatible with the electronic control units. The processor is configured to identify a version of software that is compatible with a target electronic control unit based on the compatibility information. The target electronic control unit is an electronic control unit that is an object of software updating among the electronic control units identified by the first identification information. The processor is configured to control, by communicating with the OTA master, such that software of the target electronic control unit is updated to the compatible version of the software that is identified.

4 Claims, 6 Drawing Sheets

| VIN | ECU1⇔SW1 | | ECU2⇔SW2 | | ECU3⇔SW3 | |
|---|---|---|---|---|---|---|
| 1001 | ECU1_Ver1 | SW1_Ver1.0 | ECU2_Ver1 | SW2_Ver1.0 | ECU3_Ver1 | SW3_Ver1.0 |
| | | ⋮ | | ⋮ | | ⋮ |
| | | SW1_Ver1.5 | | SW2_Ver1.2 | | SW3_Ver2.5 |
| | ECU1_Ver2 ECU1_Ver3 | SW1_Ver2.0 | ECU2_Ver2 | SW2_Ver2.0 | | |
| | | ⋮ | | ⋮ | | |
| | | SW1_Ver3.1 | | SW2_Ver2.3 | | |
| | | | ECU2_Ver3 | SW2_Ver3.0 | | |
| | | | | ⋮ | | |
| | | | | SW2_Ver4.2 | | |

(56) References Cited

U.S. PATENT DOCUMENTS

| | | | | |
|---|---|---|---|---|
| 2020/0034134 A1* | 1/2020 | Jayaraman | ............... | H04W 4/02 |
| 2020/0218531 A1* | 7/2020 | Kushwaha | ................ | G06F 8/66 |
| 2020/0272450 A1* | 8/2020 | Inoue | ..................... | B60L 53/66 |
| 2021/0026617 A1* | 1/2021 | Maru | ..................... | H04L 67/34 |
| 2021/0155252 A1 | 5/2021 | Harata et al. | | |
| 2021/0211442 A1 | 7/2021 | Haga et al. | | |

FOREIGN PATENT DOCUMENTS

| | | | | | |
|---|---|---|---|---|---|
| CN | 111708555 A | * | 9/2020 | | |
| CN | 112162770 A | * | 1/2021 | ............... | G06F 8/61 |
| CN | 112261130 A | * | 1/2021 | | |
| EP | 4099655 A1 | * | 12/2022 | ............ | G06F 8/658 |
| JP | 2004-326689 A | | 11/2004 | | |
| JP | 2014-106875 A | | 6/2014 | | |
| JP | 2018-132979 A | | 8/2018 | | |
| JP | 2020-027630 A | | 2/2020 | | |
| JP | 2020027671 A | * | 2/2020 | ........... | B60R 16/023 |
| KR | 20200059965 A | * | 5/2020 | | |
| WO | 020/080222 A1 | | 10/2002 | | |
| WO | 2020/080222 A1 | | 4/2020 | | |

\* cited by examiner

FIG. 9

| VIN | ECU1⇔SW1 | | ECU2⇔SW2 | | ECU3⇔SW3 | |
|---|---|---|---|---|---|---|
| 1001 | ECU1_Ver1 | SW1_Ver1.0 | ECU2_Ver1 | SW2_Ver1.0 | ECU3_Ver1 | SW3_Ver1.0 |
| | | ⋮ | | ⋮ | | ⋮ |
| | | SW1_Ver1.5 | | SW2_Ver1.2 | | SW3_Ver2.5 |
| | ECU1_Ver2 ECU1_Ver3 | SW1_Ver2.0 | ECU2_Ver2 | SW2_Ver2.0 | | |
| | | ⋮ | | ⋮ | | |
| | | SW1_Ver3.1 | | SW2_Ver2.3 | | |
| | | | ECU2_Ver3 | SW2_Ver3.0 | | |
| | | | | ⋮ | | |
| | | | | SW2_Ver4.2 | | |

CENTER, UPDATE MANAGEMENT METHOD, AND NON-TRANSITORY STORAGE MEDIUM

CROSS-REFERENCE TO RELATED APPLICATION

This application claims priority to Japanese Patent Application No. 2021-004360 filed on Jan. 14, 2021, incorporated herein by reference in its entirety.

BACKGROUND

1. Technical Field

The present disclosure relates to a center, an update management method, and a non-transitory storage medium to control updating of software of an electronic control unit (ECU).

2. Description of Related Art

Vehicles have a plurality of ECUs for controlling operations of the vehicles. An ECU is provided with a processor, a transitory storage unit such as random access memory (RAM), and a nonvolatile storage unit such as flash read-only memory (ROM). Control functions of the ECU are realized by the processor executing software stored in the nonvolatile storage unit. The software stored in the ECUs is rewritable, and updating to a later version of the software enables the functions of the ECUs to be improved, new vehicle control functions to be added, and so forth.

Over-the-air (OTA) technology is known as a technology for updating ECU software (see Japanese Unexamined Patent Application Publication No. 2004-326689, for example). In OTA technology, in-vehicle communication equipment connected to an in-vehicle network is wirelessly connected to a communication network such as the Internet. The in-vehicle communication equipment downloads software from an OTA center (may be referred to simply as a "center") via wireless communication, and installs the software obtained by the download. Thus, ECU programs are updated or added.

Following registration of a campaign that is an event for performing updating of software in a server, software updating by OTA is performed triggered by the vehicle requesting confirmation of whether there is update data from the OTA center. When there is a campaign, the vehicle sequentially performs downloading of the update data, installation of the update data, and activation of the update version of software, thereby updating the software of a target ECU that is an update object ECU.

SUMMARY

The designs of ECUs installed change depending on the date of production and so forth, even for the same vehicle model. Also, there are cases in which ECUs are replaced with newer models or older models, due to parts replacement or the like on the market. Thus, there are vehicles in which are installed ECUs of different generations (versions), even for the same vehicle model. Further, there are cases in which incompatible (non-conforming) software versions exist, depending on the version of the ECU. Accordingly, when updating ECU software by OTA, updating to a software version compatible with the target ECU that is the object of updating is necessary.

The present disclosure provides a center, an update management method, and a non-transitory storage medium that can update software of ECUs by OTA to an appropriate version of the software compatible with the target ECU.

A center according to the present disclosure is configured to communicate with an over-the-air (OTA) master that controls software updating of a plurality of electronic control units over a network. The electronic control units are mounted in a vehicle. The center includes a processor. The processor is configured to receive, from the OTA master, first identification information that identifies the electronic control units. The processor is configured to store compatibility information that defines a version of software that is compatible with the electronic control units. The processor is configured to identify a version of software that is compatible with a target electronic control unit based on the compatibility information. The target electronic control unit is an electronic control unit that is an object of software updating among the electronic control units identified by the first identification information. The processor is configured to control, by communicating with the OTA master, such that software of the target electronic control unit is updated to the identified version of the software that is compatible.

In the center according to the present disclosure, the processor may be configured to identify a latest version of software out of the version of the software that is compatible. The processor may be configured to control, by communicating with the OTA master, such that the software of the target electronic control unit is updated to the latest version of the software that is identified.

In the center according to the present disclosure, the processor may be configured to receive, from the OTA master, second identification information that identifies a version of software implemented in the electronic control units. The processor may be configured to determine whether the latest version of the software that is identified is implemented in the target electronic control unit, based on the second identification information. The processor may be configured to, when determining that the latest version of the software is implemented in the target electronic control unit, not control such that software of the target electronic control unit is updated to the latest version of the software that is identified.

An update management method according to the present disclosure is executed by a computer including a processor, memory, and a communication device. The communication device is configured to communicate with an OTA master that controls software updating of a plurality of electronic control units over a network. The electronic control units are mounted in a vehicle. The update management method includes receiving, from the OTA master, first identification information that identifies the electronic control units, identifying a version of software that is compatible with a target electronic control unit based on compatibility information that defines a version of software that is compatible with the electronic control units, and controlling, by communicating with the OTA master, such that software of the target electronic control unit is updated to the identified version of the software that is compatible. The target electronic control unit is an electronic control unit that is an object of software updating among the electronic control units identified by the first identification information.

A non-transitory storage medium according to the present disclosure stores instructions that are executable by a computer including a processor, memory, and a communication device, and that cause the computer to perform the following functions. The communication device is configured to communicate with an OTA master that controls software updating of a plurality of electronic control units over a network. The electronic control units are mounted in a vehicle. The functions include receiving, from the OTA master, first identification information that identifies the electronic control units, identifying a version of software that is compatible with a target electronic control unit based on compatibility information that defines a version of software that is compatible with the electronic control units, and controlling, by communicating with the OTA master, such that software of the target electronic control unit is updated to the identified version of the software that is compatible. The target electronic control unit is an electronic control units that is an object of software updating among the electronic control units identified by the first identification information.

According to the present disclosure, when performing updating of software of ECUs by OTA, updating can be performed to an appropriate version of the software that is compatible with the target ECU that is the object of updating.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 9 is a diagram for explaining an example of compatibility information stored in advance in the OTA center illustrated in FIG. 4.

DETAILED DESCRIPTION OF EMBODIMENTS

Embodiment

Figure 1:
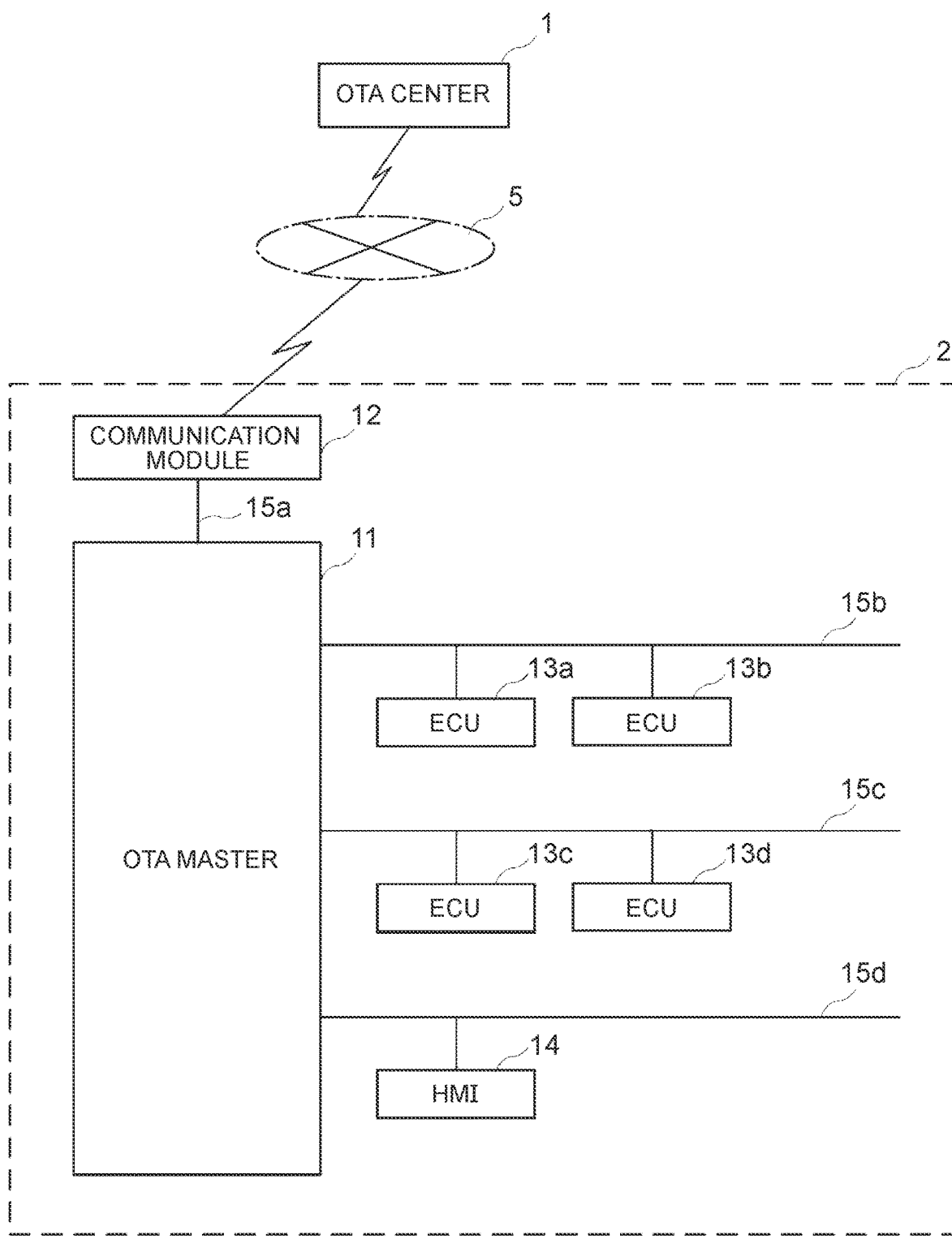
FIG. 1 is a block diagram illustrating an example of an overall configuration of a network system according to an embodiment.
Figure 2:
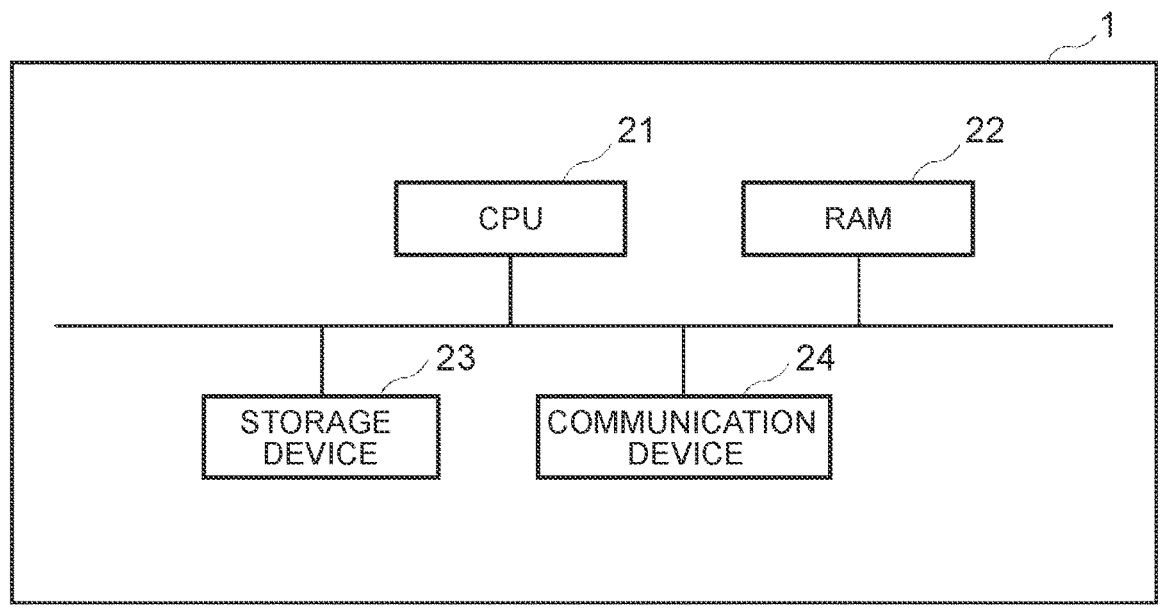
FIG. 2 is a block diagram illustrating an example of a schematic configuration of an OTA center illustrated in FIG. 1.
Figure 3:
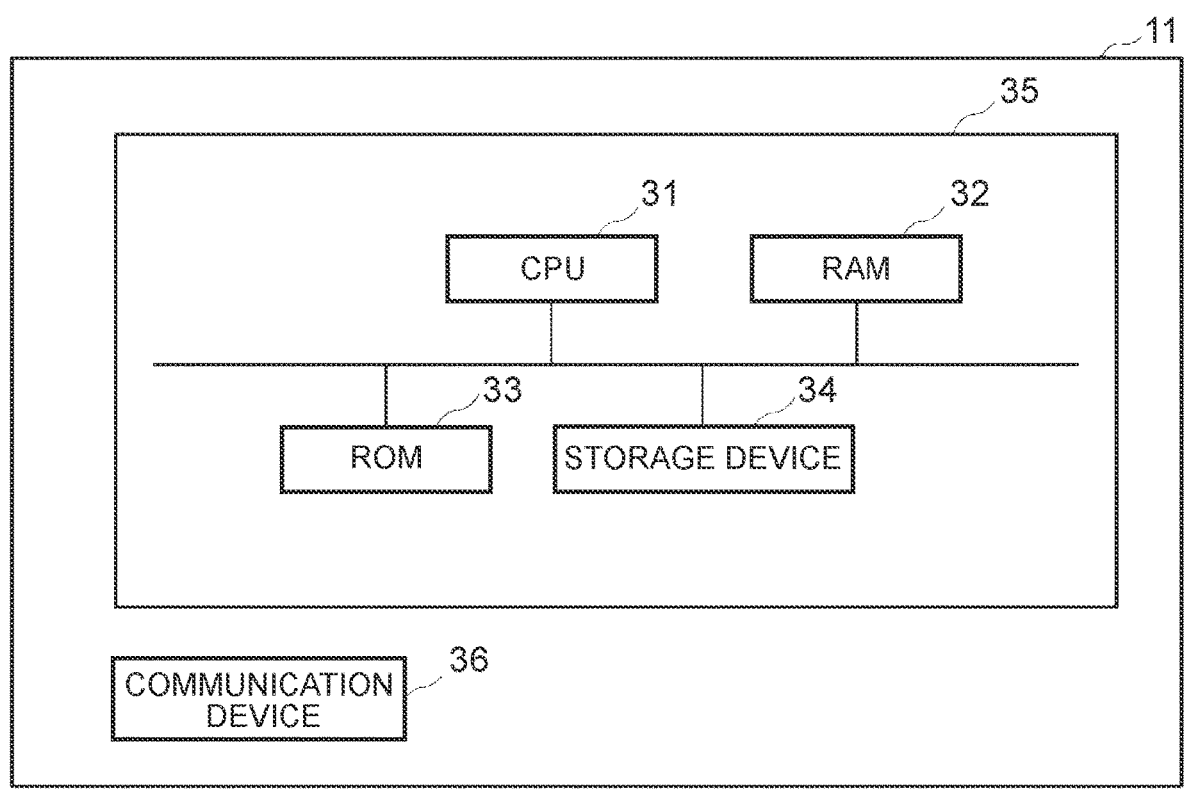
FIG. 3 is a block diagram illustrating an example of a schematic configuration of an OTA master illustrated in FIG. 1.

FIG. 1 is a block diagram illustrating an example of an overall configuration of a network system according to an embodiment of the present disclosure. FIG. 2 is a block diagram illustrating an example of a schematic configuration of an OTA center illustrated in FIG. 1. FIG. 3 is a block diagram illustrating an example of a schematic configuration of an OTA master illustrated in FIG. 1.

The network system illustrated in FIG. 1 is a system for updating software of a plurality of ECUs 13a through 13d mounted in a vehicle. The network system is provided with an OTA center (e.g., a server, may be referred to simply as "center") 1 and an in-vehicle network 2 mounted in the vehicle.

The OTA center 1 is capable of communication with an OTA master 11 mounted in the vehicle, wirelessly or the like, via a communication network 5 such as the Internet or the like. The OTA master 11 manages updating of software of the ECUs 13a through 13d mounted in the vehicle.

As illustrated in FIG. 2, the OTA center 1 is provided with a central processing unit (CPU) 21, RAM 22, a storage device 23, and a communication device 24. The storage device 23 is provided with a readable/writable storage medium such as a hard disk, a solid-state drive (SSD), or the like, and stores programs for executing software update management, information used in update management, and update data for ECUs. The CPU 21 executes programs read from the storage device 23 using the RAM 22 as a work region, thereby executing later-described control processing. The communication device 24 communicates with the OTA master 11 via the communication network 5.

The in-vehicle network 2 is provided with the OTA master 11, a communication module 12, the ECUs 13a through 13d, and a human-machine interface (HMI, an example of which is a display device of an automotive navigation system that is capable of accepting input operations) 14. The OTA master 11 is connected to the communication module 12 via a bus 15a. The OTA master 11 is connected to the ECUs 13a and 13b via a bus 15b. The OTA master 11 is connected to the ECUs 13c and 13d via a bus 15c. The OTA master 11 is connected to the HMI 14 via a bus 15d. The OTA master 11 is capable of wireless communication with the OTA center 1 via the communication module 12. The OTA master 11 controls software updating of, out of the ECUs 13a through 13d, an ECU that is the object of updating (may be referred to as "target ECU"), based on update data acquired from the OTA center 1. The communication module 12 is communication equipment that connects the in-vehicle network 2 and the OTA center 1 via the communication network 5. The ECUs 13a to 13d control operations of the parts of the vehicle. When performing update processing of software of the ECUs 13a through 13d, the HMI 14 is used for performing various types of displays. Examples of various types of display include displaying that there is update data, displaying an agreement request screen prompting a user or administrator to agree to software updating, displaying results of updating, and so forth. Note that although four ECUs 13a through 13d are exemplified in FIG. 1, the number of ECUs is not limited.

The ECUs 13a through 13d are each provided with a CPU, RAM, nonvolatile memory, and a communication device. The CPU executes software (programs) read from the nonvolatile memory (data storage region) using RAM as a work region. Also, the CPU realizes the function of the ECU by communicating with other equipment via a bus as necessary, using the communication device.

As illustrated in FIG. 3, the OTA master 11 is provided with a microcomputer 35 that has a CPU 31, RAM 32, ROM 33, and a storage device 34, and a communication device 36. The CPU 31 executes programs read from the ROM 33 using the RAM 32 as a work region, thereby executing later-described control processing. The communication device 36 performs communication with the communication module 12, the ECUs 13a through 13d, and the HMI 14, via the busses 15a through 15d illustrated in FIG. 1.

Now, the software update processing includes a download phase, an installation phase, and an activation phase. In the download phase, update data is downloaded from the OTA center 1. In the installation phase, the update data obtained by the download is transferred to the target ECU that is the object of updating, and the update version of the software is installed in the storage region of the target ECU. In the activation phase, the update version of the software installed in the target ECU is enabled.

Downloading is processing of receiving update data transmitted from the OTA center 1, and storing the update data in the storage device 34. The update data is data for updating the software of the ECU. The download phase includes not only reception of the update data, but also includes control of a series of processing relating to downloading, such as determining whether downloading can be executed, verification of the update data, and so forth. Installing is processing of writing the update version program (update software) to the nonvolatile memory of the target ECU that is the object of updating, based on the update data obtained by download. The installation phase includes not only execution of installing, but also includes control of a series of processing relating to installing, such as determining whether installation can be executed, transfer of the update data, verification of the update version program, and so forth. Activating is processing of activating (enabling) the installed update version program. The activation phase includes not only execution of activating, but also includes control of a series of processing relating to activating, such as determining whether activation can be executed, verification of execution results, and so forth.

The update data transmitted from the OTA center 1 to the OTA master 11 may contain any of update software for ECUs, compressed data in which update software has been compressed, and divided data in which update software or compressed data has been divided. Also, the update data may contain an identifier for identifying the target ECU that is the object of updating (ECU ID), and an identifier for identifying software before updating (ECU software ID). The update data is downloaded as a distribution package. The distribution package contains update data for one or more ECUs.

When the update data includes the update software itself, the OTA master 11 transfers the update data (i.e., update software) to the target ECU in the installation phase. Also, when the update data includes compressed data, differential data, or divided data of the update software, the OTA master 11 may transfer the update data to the target ECU and the target ECU may generate the update software from the update data. Also, the OTA master 11 may generate the update software from the update data, and thereafter transfer the update software to the target ECU. Now, generating the update software can be performed by decompressing compressed data, or assembling differential data or divided data.

Installation of the update software can be performed at the target ECU, based on an installation request from the OTA master 11. Alternatively, the target ECU, which has received the update data, may autonomously perform installation without receiving any explicit instruction from the OTA master 11.

The update software can be activated by the target ECU based on an activation request from the OTA master 11. Alternatively, the target ECU, which has received the update data, may autonomously activate the update software without receiving any explicit instruction from the OTA master 11.

Figure 4:
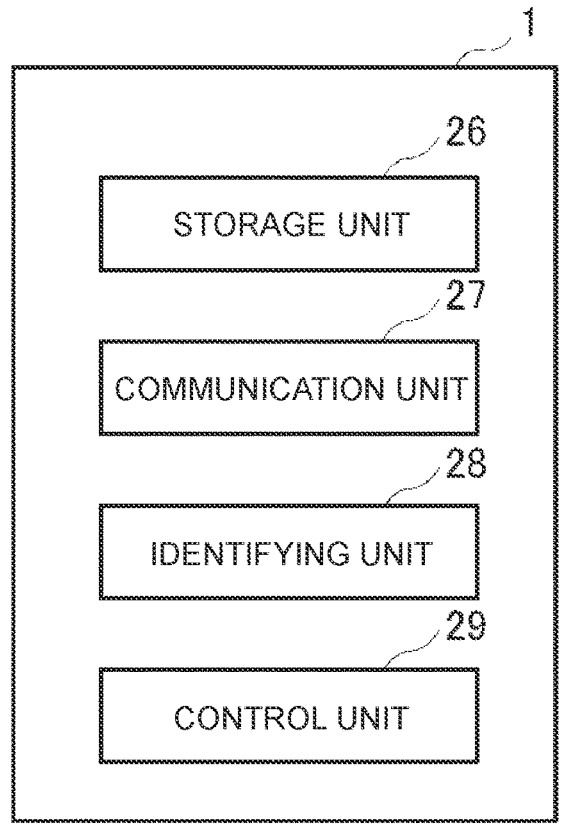
FIG. 4 is a functional block diagram illustrating an example of the OTA center illustrated in FIG. 1.

FIG. 4 is a functional block diagram illustrating an example of the OTA center 1 illustrated in FIG. 1. As illustrated in FIG. 4, the OTA center 1 is provided with a storage unit 26, a communication unit 27, an identifying unit 28, and a control unit 29. The communication unit 27, the identifying unit 28, and the control unit 29 are realized by the CPU 21 shown in FIG. 2 executing a program stored in the storage device 23 using the RAM 22. The storage unit 26 is realized by the storage device 23 shown in FIG. 2.

Figure 5:
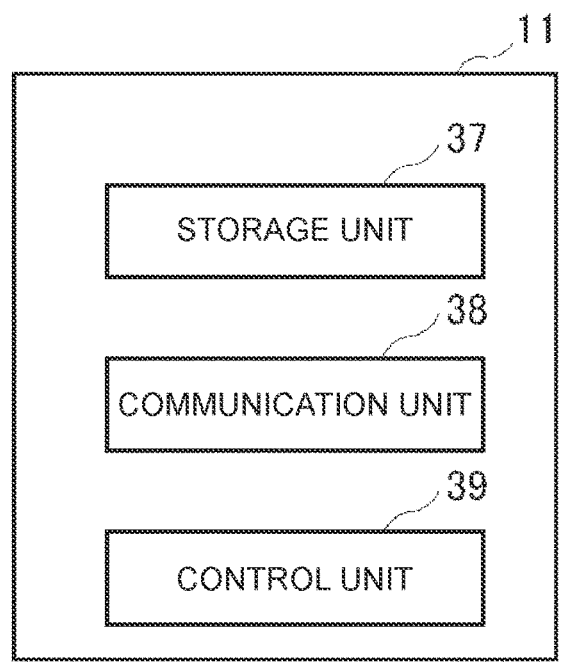
FIG. 5 is a functional block diagram illustrating an example of the OTA master illustrated in FIG. 1.

FIG. 5 is an example of a functional block diagram of the OTA master 11 illustrated in FIG. 1. As illustrated in FIG. 5, the OTA master 11 is provided with a storage unit 37, a communication unit 38, and a control unit 39. The communication unit 38 and the control unit 39 are realized by the CPU 31 illustrated in FIG. 3 executing programs stored in the ROM 33 using the RAM 32. The storage unit 37 is realized by the storage device 34 illustrated in FIG. 3.

Figure 6:
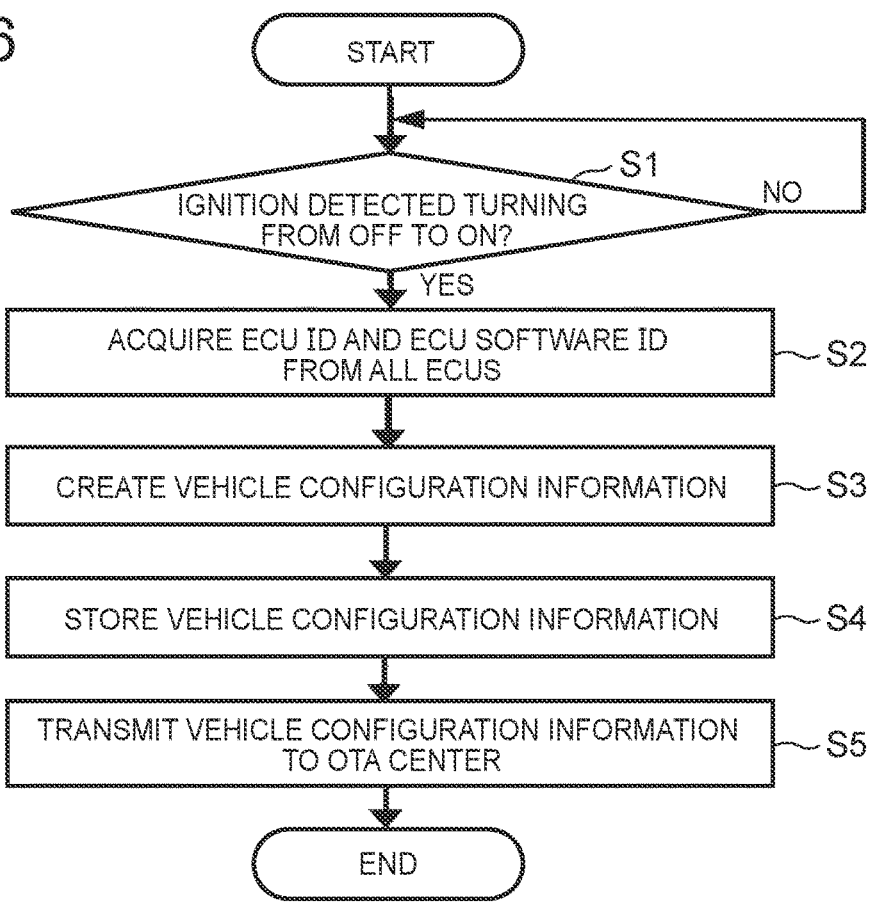
FIG. 6 is a flowchart showing an example of control processing executed by the OTA master according to the embodiment.
Figure 7:
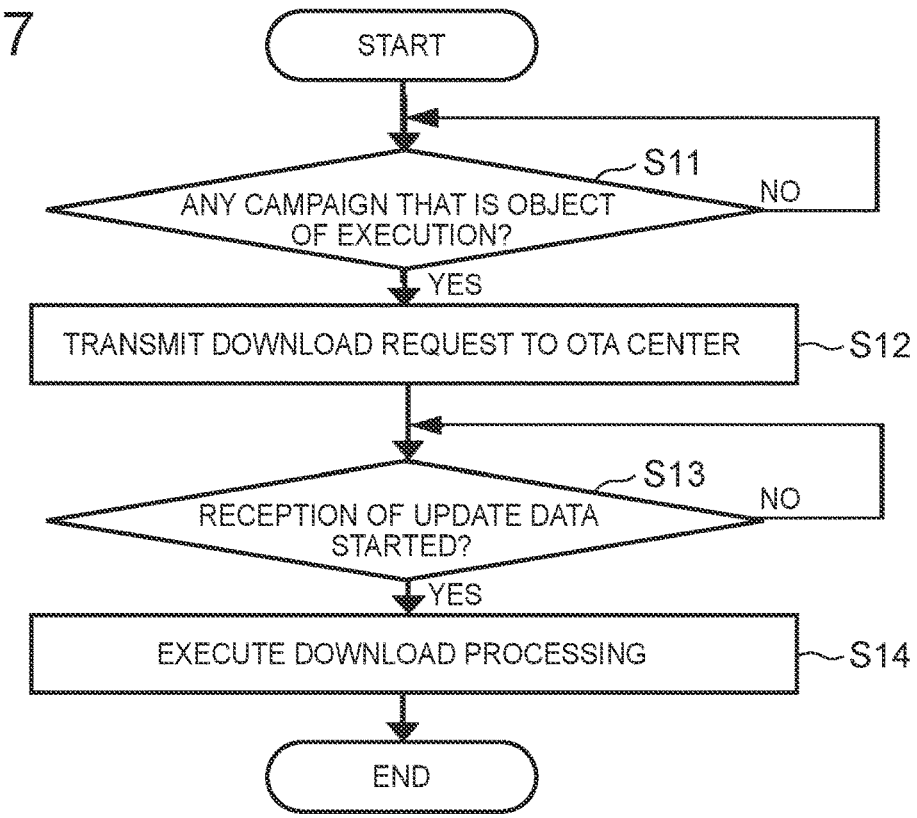
FIG. 7 is a flowchart showing an example of control processing executed by the OTA master according to the embodiment.
Figure 8:
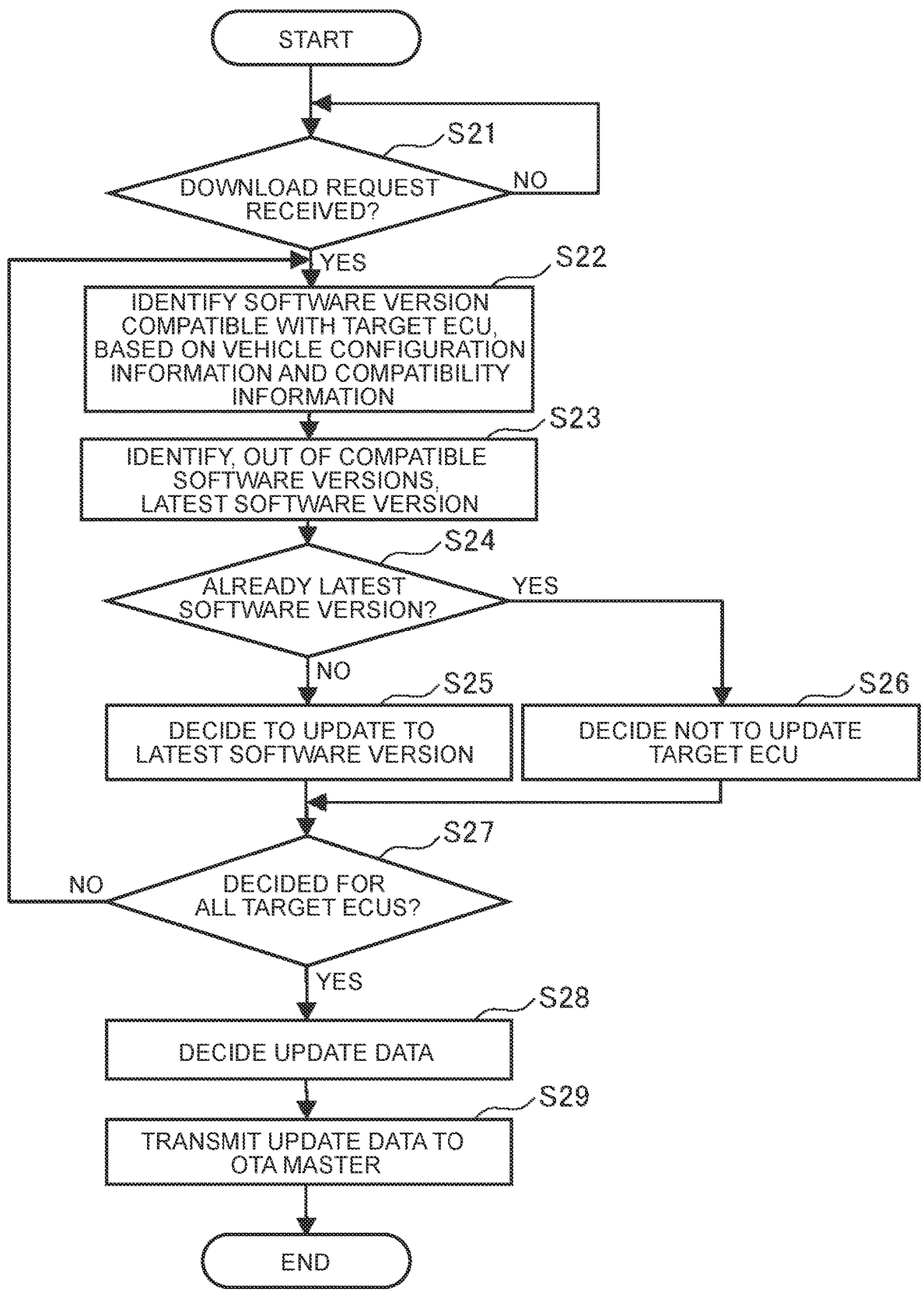
FIG. 8 is a flowchart showing an example of control processing executed by the OTA center according to the embodiment.

FIGS. 6 and 7 are flowcharts illustrating an example of the control processing executed by the OTA master 11 according to the present embodiment. FIG. 8 is a flowchart illustrating an example of the control processing executed by the OTA center 1 according to the present embodiment. The control processing according to the present embodiment will be described below with reference to the flowcharts illustrated in FIGS. 6 to 8.

First, an example of the control processing of the OTA master 11 will be described with reference to FIGS. 6 and 7.

In step S1 of FIG. 6, the control unit 39 stands until detection of the ignition (IG) of the vehicle being turned on, and upon detecting that the ignition has been turned on, the processing transitions to step S2.

In step S2, the control unit 39 acquires each of the ECU ID and the ECU software ID from all the ECUs of the vehicle. The ECU ID enables identification of the type and version of the ECU. The ECU software ID enables identification of the type and version of the software (referred to as "SW" in some cases). Thereafter, the processing transitions to step S3.

In step S3, the control unit 39 creates vehicle configuration information using the ECU ID and the ECU software ID acquired in step S2. The vehicle configuration information includes a vehicle identification number (VIN) that enables the vehicle to be identified, the ECU ID, and the ECU software ID. Thereafter, the processing transitions to step S4.

In step S4, the control unit 39 stores the vehicle configuration information created in step S3 in the storage unit 37. Now, an arrangement may be made in which, for the vehicle configuration information, only the latest vehicle configuration information may be stored, or history information including previous vehicle configuration information may be stored. Thereafter, the processing transitions to step S5.

In step S5, the control unit 39 transmits the vehicle configuration information created in step S3 to the OTA center 1 using the communication unit 38, and ends the series of processing shown in FIG. 6. Note that the OTA center 1 receives the vehicle configuration information from the control unit 39 via the OTA master 11, the vehicle configuration information is then stored in the storage unit 26.

According to the above processing, each time the ignition is turned on, vehicle configuration information is created and stored by the OTA master 11, and the vehicle configuration information is transmitted to and stored in the OTA center 1. Accordingly, the OTA master 11 and the OTA center 1 share the vehicle configuration information.

In step S11 of FIG. 7, the control unit 39 stands until determination is made that there is a campaign to be executed (event for updating the software of the ECU). When determining that there is a campaign to be executed, the control unit 39 transitions the processing to step S12. For example, the control unit 39 detects that a campaign applicable to the vehicle has occurred by querying the OTA center 1 (e.g., periodically). When detecting that a campaign applicable to the vehicle has occurred, the control unit 39 notifies the user thereof. When the user performs an operation of agreeing to the application of the campaign, determination is made that there is a campaign to be executed (YES in step S11).

In step S12, the control unit 39 transmits a download request, for update data in order to apply the campaign, to the OTA center 1 using the communication unit 38. Thereafter, the processing transitions to step S13. The download request includes a VIN that enables identification of the vehicle making the download request.

In step S13, the control unit 39 stands until reception of the update data requested in step S12 starts, and when reception of the update data starts, the processing transitions to step S14.

In step S14, the control unit 39 executes download processing for storing the update data, regarding which reception was started in step S13, in the storage unit 37. When this processing is completed, the series of processing shown in FIG. 7 is completed.

Through the above processing, the OTA master 11 downloads, from the OTA center 1, the update data for applying the campaign to be executed. Thereafter, the update version of the software is installed in one or more target ECUs, which are ECUs that are the object of software updating, using the update data obtained by download. Thereafter, the update version of the software is activated, and the application of the campaign is completed.

Next, an example of the control processing of the OTA center 1 will be described with reference to FIG. 8.

In step S21 of FIG. 8, the control unit 29 stands until the download request (see S12 of FIG. 7) is received from the OTA master 11, and upon receiving the download request, transitions the processing to step S22. When receiving a notification of agreement to campaign application from the OTA master 11, the control unit 29 starts reception standby for the download request. The notification of agreement to campaign application is executed in response to the user performing the operation of agreeing to application of the campaign.

In step S22, the identifying unit 28 identifies a SW version compatible with the target ECU for the vehicle that has made the download request, based on the vehicle configuration information and the compatibility information stored in the storage unit 26. The vehicle configuration information is information stored in the storage unit 26 in accordance with processing by the OTA master 11 described with reference to FIG. 6. The vehicle configuration information is information including a VIN of each vehicle, an ECU ID, and an ECU software ID. The ECU ID is an example of "first identification information". The ECU software ID is an example of "second identification information". The compatibility information is information that defines the type and version of the ECU and the type and version of the software, mounted in each vehicle. The compatibility information defines the compatibility (conformity) between the ECU and the software.

FIG. 9 is a diagram for describing the compatibility information. As shown in FIG. 9, the installed ECU and the version of that ECU, and the software compatible with the ECU and the version of that software, are defined in the compatibility information, for each VIN that identifies a vehicle. Note that FIG. 9 shows compatibility information relating to a vehicle of VIN "1001", and the description of compatibility information relating to other vehicles is omitted. This will be described in detail below with reference to FIG. 9.

As shown in FIG. 9, ECU1, ECU2, and ECU3 are mounted in the vehicle of VIN "1001". Defined therein is that first software (SW1) is used for the ECU1. Defined therein is that second software (SW2) is used for the ECU2. Defined therein is that third software (SW3) is used for the ECU3. Also defined therein is that versions 1 to 3 (ECU1_Ver1 to 3) exist in the ECU1. Defined therein is that versions 1 to 3 (ECU2_Ver1 to 3) exist in the ECU2. Defined therein is that version 1 (ECU3_Ver1) exists in ECU3. Also defined therein is that versions 1.0 to 3.1 (SW1_Ver1.0 to 3.1) of the first software exist. Defined therein is that versions 1.0 to 4.2 (SW2_Ver1.0 to 4.2) of the second software exist. Defined therein is that versions 1.0 to 2.5 (SW3_Ver1.0 to 2.5) of the third software exist. Moreover, defined therein is that only versions 1.0 to 1.5 (SW1_Ver1.0 to 1.5) of the first software are compatible with version 1 (ECU1_Ver1) of the ECU1. Defined therein is that only versions 2.0 to 3.1 (SW1_Ver2.0 to 3.1) of the first software are compatible with versions 2 and 3 (ECU1_Ver2 and 3) of the ECU1. Defined therein is that only versions 1.0 to 1.2 (SW2_Ver1.0 to 1.2) of the second software are compatible with version 1 (ECU2_Ver1) of the ECU2. Defined therein is that only versions 2.0 to 2.3 (SW2_Ver2.0 to 2.3) of the second software are compatible with version 2 (ECU2_Ver2) of the ECU2. Defined therein is that only versions 3.0 to 4.2 (SW2_Ver3.0 to 4.2) of the second software are compatible with version 3 (ECU2_Ver3) of the ECU2. Defined therein is that only versions 1.0 to 2.5 (SW3_Ver1.0 to 2.5) of the third software are compatible with version 1 (ECU3_Ver1) of the ECU3.

In step S22, the identifying unit 28 refers to the compatibility information and the vehicle configuration information related to the VIN included in the download request received in step S21. For example, when the VIN included in the download request received in step S21 is "1001", the identifying unit 28 refers to the compatibility information (see FIG. 9) and the vehicle configuration information related to the VIN "1001". Next, the identifying unit 28 identifies the version of the target ECU, based on the ECU ID included in the vehicle configuration information. Further, the identifying unit 28 identifies the software and a software version compatible with the target ECU based on the compatibility information. For example, in the case of FIG. 9, when the identifying unit 28 identifies that the target ECU1 is version 1 (ECU1_Ver1), the identifying unit 28 identifies that the software compatible with the target ECU1 is version 1.0 to 1.5 (SW1_Ver1.0 to 1.5) of the first software. Thereafter, the processing transitions to step S23.

In step S23, the identifying unit 28 identifies, out of the software versions that are compatible with the target ECU identified in step S22, the latest version. For example, in the case of FIG. 9, the identifying unit 28 identifies SW1_Ver1.5 as the latest software version compatible with the target ECU1_Ver1. Thereafter, the processing transitions to step S24.

In step S24, the control unit 29 determines whether the latest version of the software identified in step S23 is already implemented in the target ECU, based on the ECU software ID included in the vehicle configuration information stored in the storage unit 26. For example, in the case of FIG. 9, when determining that SW1_Ver1.5 is implemented in the target ECU1_Ver1, based on the ECU software ID included in the vehicle configuration information, the control unit 29 determines that the latest version of the software is already installed in the target ECU1_Ver1. When the determination in step S24 is YES, the processing transitions to step S26. When the determination in step S24 is NO, the processing transitions to step S25.

In step S25, the control unit 29 decides to update the target ECU with the latest version identified in step S23. Thereafter, the processing transitions to step S27.

On the other hand, in step S26, the control unit 29 decides not to update the software of the target ECU, since the software of the target ECU already is the latest version identified in step S23. Thereafter, the processing transitions to step S27.

In step S27, the control unit 29 determines whether the decisions in steps S25 and S26 have been executed for all the target ECUs. When the determination in step S27 is YES, the processing transitions to step S28, and when this determination is NO, the processing returns to step S22 and the processing is executed for the next target ECU.

In step S28, the control unit 29 decides the update data (update data for updating the software of the target ECU) to be transmitted to the OTA master 11 that made the download request (see S12 in FIG. 7) received in step S21, based on the decision in steps S25 and/or S26. For example, in the case of FIG. 9, a case in which the target ECUs are ECU1_Ver1 and ECU2 Ver2 will be considered. In this case, when it is determined that SW1_Ver1.5 is implemented in ECU1_Ver1 and SW2_Ver2.1 is implemented in ECU2_Ver2, the control unit 29 decides the update data to update the ECU2_Ver2 to SW2_Ver2.3, as the update data to be transmitted. Thereafter, the processing transitions to step S29. Note that when deciding all of the target ECUs are not to be updated in step S26, decision is made in step S28 that there is no update data to be transmitted.

In step S29, the control unit 29 transmits the update data decided upon in step S28 to the OTA master 11 (the OTA master 11 requesting the download) using the communication unit 27, and ends the series of processing. Note that an arrangement may be made in which, when a target ECU decided not to be updated in step S26 exists, information indicating this may be transmitted to the OTA master 11. Further, when all of the target ECUs are decided not to be updated in step S26, no update data is transmitted. In this case, information indicating that may be transmitted to the OTA master 11.

As described above, the OTA center 1 according to the present embodiment identifies a software version compatible with the target ECU and transmits update data to the OTA master 11 (vehicle), using the compatibility information described with reference to FIG. 9. This enables updating to an appropriate software version compatible with the target ECU.

Further, the OTA center 1 according to the present embodiment identifies, out of software versions compatible with the target ECU, the latest version, and transmits the update data to the OTA master 11 (vehicle). This enables updating to, out of software versions compatible with the target ECU, the latest version.

Also, when the latest version out of the software versions compatible with the target ECU is already implemented in the target ECU, the OTA center 1 according to the present embodiment does not transmit update data for updating to the latest version to the OTA master 11 (vehicle). As a result, unnecessary processing can be omitted.

Note that in the above embodiment, a control example has been described in which, triggered by the ignition being turned on, the OTA master 11 creates and holds vehicle configuration information, and transmits the vehicle configuration information to the OTA center 1, so as to share the vehicle configuration information between the OTA master 11 and the OTA center 1 (see FIG. 6). However, the trigger for creating and sharing vehicle configuration information between the OTA master 11 and the OTA center 1 is not limited to this. For example, an arrangement may be made in which, when the OTA center 1 receives the download request from the OTA master 11 (when determination of YES is made in step S21 of FIG. 8), the OTA center 1 may request the vehicle configuration information from the OTA master 11. Further, an arrangement may be made in which the OTA master 11 creates and transmits the vehicle configuration information to the OTA center 1 in response to a vehicle configuration information request, and the OTA center 1 may receive and use the vehicle configuration information in the processing of step S22. By doing so, the OTA center 1 can acquire the latest vehicle configuration information immediately prior to using the vehicle configuration information in the processing of FIG. 8.

The function of the OTA center 1 exemplified in the embodiment above can also be realized as an update management method executed by a computer provided with a processor (CPU), memory, and a communication device, an update management program executed by the computer, or a computer-readable non-transitory storage medium storing the update management program. Similarly, the function of the OTA master 11 exemplified as the embodiment can be realized as an update control method executed by an in-vehicle computer provided with a processor (CPU), memory, and a communication device, an update control program executed by the in-vehicle computer, or a computer readable non-transitory storage medium that stores the update control program.

The disclosed technology can be used in a network system for updating a program of an electronic control unit (ECU).

What is claimed is:

1. A center configured to communicate with an OTA master that controls software updating of a first electronic control unit and a second electronic control unit over a network, the first electronic control unit and the second electronic control unit being mounted in a vehicle, the first electronic control unit and the second electronic control unit including a plurality of versions respectively, the center comprising a processor configured to:
receive, from the OTA master, first identification information that identifies the first electronic control unit and the second electronic control unit, the first identification information including information on the version of the first electronic control unit and the version of the second electronic control unit;
store compatibility information that defines,
  (i) first software that is compatible with the first electronic control unit,
  (ii) second software that is compatible with the second electronic control unit,
  (iii) one or more versions of the first software that is compatible with each of the versions of the first electronic control unit, and
  (iv) one or more versions of second software that is compatible with each of the versions of the second electronic control unit;
identify one or more versions of software that is compatible with a version of a target electronic control unit based on the compatibility information, the target electronic control unit being an electronic control unit that is an object of the software updating among the first electronic control unit and the second electronic control unit, the version of the target electronic control being identified by the first identification information;
identify a latest version of software out of the versions of the software that is compatible with the version of the target electronic control unit; and
transmit a distribution package to the OTA master, such that software of the target electronic control unit is updated to the latest version of the software that is identified, the distribution package including:
identification information that identifies the target electronic control unit;
identification information that identifies software implemented in the target electronic control unit before the software updating by using the distribution package; and
identification information that identifies software to be implemented in the target electronic control unit after the software updating by using the distribution package.

2. The center according to claim 1, wherein the processor is configured to:
receive, from the OTA master, second identification information that identifies a version of software implemented in the first electronic control unit and a version of software implemented in the second electronic control unit;
determine whether the latest version of the software that is identified is implemented in the target electronic control unit, based on the second identification information; and
when determining that the latest version of the software is implemented in the target electronic control unit, not control such that software of the target electronic control unit is updated to the latest version of the software that is identified.

3. An update management method executed by a computer including a processor, memory, and a communication device, the communication device being configured to communicate with an OTA master that controls software updating of a first electronic control unit and a second electronic control unit over a network, the first electronic control unit and the second electronic control unit being mounted in a vehicle, the first electronic control unit and the second electronic control unit including a plurality of versions respectively, the update management method comprising:
receiving, from the OTA master, first identification information that identifies the first electronic control unit and the second electronic control unit, the first identification information including information on the version of the first electronic control unit and the version of the second electronic control unit;
identifying one or more versions of software that is compatible with a version of a target electronic control unit based on compatibility information, the target electronic control unit being an electronic control unit that is an object of software updating among the first electronic control unit and the second electronic control unit, the version of the target electronic control being identified by the first identification information, the compatibility information defining,
(i) first software that is compatible with the first electronic control unit,
(ii) second software that is compatible with the second electronic control unit,
(iii) one or more versions of the first software that is compatible with each of the versions of the first electronic control unit, and
(iv) one or more versions of second software that is compatible with each of the versions of the second electronic control unit;
identifying a latest version of software out of the versions of the software that is compatible with the version of the target electronic control unit; and
transmitting a distribution package to the OTA master, such that software of the target electronic control unit is updated to the latest version of the software that is identified, the distribution package including:
identification information that identifies the target electronic control unit;
identification information that identifies software implemented in the target electronic control unit before the software updating by using the distribution package; and
identification information that identifies software to be implemented in the target electronic control unit after the software updating by using the distribution package.

4. A non-transitory storage medium storing instructions that are executable by a computer including a processor, memory, and a communication device and that cause the computer to perform functions, the communication device being configured to communicate with an OTA master that controls software updating of a first electronic control unit and a second electronic control unit over a network, the first electronic control unit and the second electronic control unit being mounted in a vehicle, the first electronic control unit and the second electronic control unit including a plurality of versions respectively, the functions comprising:
receiving, from the OTA master, first identification information that identifies the first electronic control unit and the second electronic control unit, the first identification information including information on the version of the first electronic control unit and the version of the second electronic control unit;
identifying one or more versions of software that is compatible with a version of a target electronic control unit based on compatibility information, the target electronic control unit being an electronic control unit that is an object of software updating among the first electronic control unit and the second electronic control unit, the version of the target electronic control being identified by the first identification information, the compatibility information defining,
(i) first software that is compatible with the first electronic control unit,
(ii) second software that is compatible with the second electronic control unit,
(iii) one or more versions of the first software that is compatible with each of the versions of the first electronic control unit, and
(iv) one or more versions of second software that is compatible with each of the versions of the second electronic control unit;
identifying a latest version of software out of the versions of the software that is compatible with the version of the target electronic control unit; and
transmitting a distribution package to the OTA master, such that software of the target electronic control unit is updated to the latest version of the software that is identified, the distribution package including:

identification information that identifies the target electronic control unit;

identification information that identifies software implemented in the target electronic control unit before the software updating by using the distribution package; and identification information that identifies software to be implemented in the target electronic control unit after the software updating by using the distribution package.

* * * * *